(12) United States Patent
Nade

(10) Patent No.: US 9,848,329 B2
(45) Date of Patent: Dec. 19, 2017

(54) PORTABLE TERMINAL AND LOCK STATE CONTROL METHOD

(71) Applicant: KYOCERA Corporation, Kyoto-Shi, Kyoto (JP)

(72) Inventor: Toshiaki Nade, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/443,344

(22) PCT Filed: Nov. 14, 2013

(86) PCT No.: PCT/JP2013/080739
§ 371 (c)(1),
(2) Date: May 15, 2015

(87) PCT Pub. No.: WO2014/077296
PCT Pub. Date: May 22, 2014

(65) Prior Publication Data
US 2015/0334570 A1   Nov. 19, 2015

(30) Foreign Application Priority Data

Nov. 15, 2012 (JP) .................................. 2012-250871

(51) Int. Cl.
*H04M 1/66* (2006.01)
*H04W 12/08* (2009.01)
(Continued)

(52) U.S. Cl.
CPC ........ *H04W 12/08* (2013.01); *G06F 3/04817* (2013.01); *G06F 3/04883* (2013.01);
(Continued)

(58) Field of Classification Search
CPC ............... G06F 3/0488; G06F 3/04883; G06F 3/04817; G06F 21/36; G06F 3/0484;
(Continued)

(56) References Cited

U.S. PATENT DOCUMENTS 9,154,954 B2 * 10/2015 Tamai ..................... H04M 1/67
2005/0003799 A1 * 1/2005 Kang .................... H04M 1/673
455/411

(Continued)

FOREIGN PATENT DOCUMENTS

JP   H11-203045 A   7/1999
JP   2012-133787 A   7/2012

OTHER PUBLICATIONS

International Search Report dated Feb. 10, 2014 issued for International Application No. PCT/JP2013-080739.

(Continued)

*Primary Examiner* — Nimesh Patel
(74) *Attorney, Agent, or Firm* — Procopio Cory Hargreaves and Savitch LLP

(57) ABSTRACT

A mobile phone 10 comprises a display 14 and a touch panel 16, and a lock state of restricting performance of the predetermined processing based on a touch operation is set. A home screen including a function icon is displayed on the display 14. When the lock state is set, a lock screen is produced based on this home screen. Then, the lock screen is displayed if the power supply of the display 14 is turned on. A cancellation icon corresponding to the function icon is included in the lock screen. If a cancellation operation using the cancellation icon corresponding to a mail application is performed the lock state is canceled and the mail application is performed.

7 Claims, 8 Drawing Sheets

(A)

(B)

(C)

(51) Int. Cl.
*H04W 12/06* (2009.01)
*G06F 3/0481* (2013.01)
*G06F 21/36* (2013.01)
*H04M 1/67* (2006.01)
*G06F 3/0488* (2013.01)
*G06F 21/31* (2013.01)

(52) U.S. Cl.
CPC .............. *G06F 21/31* (2013.01); *G06F 21/36* (2013.01); *H04M 1/67* (2013.01); *H04W 12/06* (2013.01); *H04M 2250/52* (2013.01)

(58) Field of Classification Search
CPC .. G06F 3/04842; G06F 3/04886; G06F 21/31; G06F 21/32; G06F 3/03547; G06F 3/0486; G06F 2221/2147; G06F 3/0416; G06F 3/04845; G06F 21/629; G06F 21/6218; G06F 2221/031; G06F 2221/2113; G06F 2221/2141; G06F 21/57; G06F 3/038; H04M 1/72552; H04M 1/7255; H04M 1/72555; H04M 2250/22
See application file for complete search history.

(56) References Cited

U.S. PATENT DOCUMENTS

| | | | |
|---|---|---|---|
| 2009/0241072 A1* | 9/2009 | Chaudhri | G06F 3/04883 715/863 |
| 2010/0001967 A1* | 1/2010 | Yoo | G06F 3/0488 345/173 |
| 2011/0130170 A1* | 6/2011 | Han | G06F 1/1694 455/566 |
| 2012/0084734 A1* | 4/2012 | Wilairat | G06F 21/36 715/863 |
| 2013/0102281 A1* | 4/2013 | Kanda | G06F 21/36 455/410 |

OTHER PUBLICATIONS iPhone 5 & iOS 6 Perfect Guide mini, Tsukai Konashi ya Apuri no Joho ga Mansai, iPhone PEOPLE, Sep. 29, 2012 (Sep. 29, 2012), p. 76.

Sono Looks, Utsukushii Ekisho ni Hitomebore! iPhone 4/iOS 4 Tokuno Report, Mac People, Jun. 29, 2010 (Jun. 29, 2010), vol. 16, No. 8, p. 30, upper right column.

Yoshito Nakasuji, Hosomie, 3D Avatar, Mangekyo kara Kokino Video Chat mo! Sumaho Income Kyukyoku Apuri o Kiwameru!, Weekly Ascii, vol. 24, whole No. 870, Feb. 21, 2012 (Feb. 21, 2012), vol. 24, p. 36, upper right column.

Written Opinion of the International Searching Authority issued by Japan Patent Office for International Application No. PCT/JP2013/080739.

* cited by examiner

PORTABLE TERMINAL AND LOCK STATE CONTROL METHOD

CROSS-REFERENCE TO RELATED APPLICATION

This application is related to co-pending U.S. application Ser. No. 14/443,356 which is the US National Stage of International Application No. PCT/JP2013/080746 filed on Nov. 14, 2013, which claims priority to Japanese Patent Application No. JP 2012-250872, each of which is incorporated herein by reference in its entirety.

FIELD OF ART

The present invention relates to a portable terminal and a lock state control method, and more specifically, a portable terminal and a lock state control method, capable of setting a lock state.

BACKGROUND ART

In a portable terminal device that is an example of a background art, a gesture such as an operation performing a double-tap is registered for each operation scene. Then, if a gesture corresponding to an operation scene is performed to a touch panel when an operation of the touch panel is halted, the touch panel returns to a normal state from a halt state.

SUMMARY OF THE INVENTION

Problems to be Solved by the Invention

In the above-mentioned portable terminal device, when registering a plurality of operation scenes, a user has to memorize all of the plurality of operation scenes and gestures corresponding to them. Then, if the user forgets such a correspondence relationship between the gesture and the operation scene when the user returns the touch panel to the normal state from the halt state, it becomes impossible for the user to operate the portable terminal device as desired.

Therefore, it is a primary object of the present invention to provide a novel portable terminal and lock state control method.

It is another object of the present invention to provide a portable terminal and lock state control method, capable of improving operability for a user.

Means for Solving a Problem

A first aspect of the present invention is a portable terminal that has a display module operable to display a home screen including at least a first icon and a touch panel provided in the display module, and a lock state of restricting a performance of predetermined processing based on a touch operation can be set, comprising: a producing module operable to produce a lock screen that includes a second icon corresponding to the first icon; a display processing module operable to display the lock screen when a power supply of the display module is turned on in a state where the lock state is set; a canceling module operable to cancel if a cancellation operation that includes at least an operation touching to the second icon is performed when the lock screen is displayed; and a performance module operable to perform the processing based on the first icon corresponding to the second icon when the cancellation operation that includes at least an operation touching to the second icon is performed.

A second aspect of the present invention is a lock state control method in a portable terminal that has a display module operable to display a home screen including at least a first icon and a touch panel provided in the display module, and a lock state of restricting a performance of predetermined processing based on a touch operation can be set, a processor of the portable terminal performing steps of: producing a lock screen that includes a second icon corresponding to the first icon; display-processing the lock screen when a power supply of the display module is turned on in a state where the lock state is set; canceling if a cancellation operation that includes at least an operation touching to the second icon is performed when the lock screen is displayed; and performing the processing based on the first icon corresponding to the second icon when the cancellation operation that includes at least an operation touching to the second icon is performed.

Advantage of the Invention

According to the present invention, operability for the user in a lock screen is improved.

The above described objects and other objects, features, aspects and advantages of the invention will become more apparent from the following detailed description of the invention when taken in conjunction with the accompanying drawings.

BRIEF DESCRIPTION OF THE DRAWINGS

FIG. 1 illustrates an appearance of a mobile phone of an embodiment of the present invention, wherein FIG. 1(A) shows an appearance of a main surface of the mobile phone, and FIG. 1(B) shows an appearance of another surface of the mobile phone.

FIG. 4 illustrates an example of an operation that changes a home screen displayed on the display shown in FIG. 1, wherein FIG. 4(A) shows an example of an operation to a first home screen, and FIG. 4(B) shows an example of a second home screen displayed by an operation of changing a home screen.

FIG. 5 illustrates an example of a touch operation that performs processing relevant to a function icon shown in FIG. 3, wherein FIG. 5(A) shows an example of a touch operation to the function icon, and FIG. 5(B) shows an example of a screen displayed by performed processing.

FIG. 7 illustrates an example of a cancellation operation performed to the lock screen shown in FIG. 6, wherein FIG. 7(A) shows an example of a touch operation to a lock object, FIG. 7(B) shows an example of a touch operation to a cancellation icon, and FIG. 7(C) shows an example of a state where an application relevant to the cancellation icon shown in FIG. 7(B) is performed.

FIG. 8 illustrates an example of a touch operation performed on a setting screen displayed on the display 14 shown in FIG. 1, wherein FIG. 8(A) shows an example of display of the setting screen, FIG. 8(B) shows an example of an operation to the setting screen, and FIG. 8(C) shows another example of display of the setting screen.

FORMS FOR EMBODYING THE INVENTION

With referring to FIGS. 1(A) and 1(B), a mobile phone 10 of an embodiment according to the present invention is a smartphone as an example, and includes a longitudinal flat rectangular housing 12. However, it is pointed out in advance that the present invention can be applied to an arbitrary portable terminal such as a tablet terminal, a PDA, etc.

A display 14 of a liquid crystal, organic EL or the like that functions as a display module is provided on a main surface (front surface) of the housing 12. A touch panel 16 is provided on the display 14. Therefore, in the mobile phone 10 of this embodiment, the most part of an input operation excepting an input by an operation of hardware keys described later is performed through the touch panel 16.

A speaker 18 is housed in the housing 12 at one end of a longitudinal direction on a side of the main surface, and a microphone 20 is housed at the other end in the longitudinal direction on the side of the main surface.

As hardware keys constituting an input operating module together with the touch panel 16, a call key 22a, an end key 22b and a home key 22c are provided on the main surface of the housing 12, in this embodiment.

Furthermore, a lens aperture 24 that communicates with a camera module 50 (see FIG. 2) is provided at one end of the longitudinal direction on another surface (rear surface) of the housing 12.

The user can input a telephone number by performing a touch operation by the touch panel 16 to a dial key (not shown) displayed on the display 14, for example, and start a telephone conversation by operating the call key 22a. If the end key 22b is operated, the telephone conversation can be ended. In addition, by long-depressing the end key 22b, it is possible to turn on/off a power supply of the mobile phone 10.

Furthermore, if the home key 22c is operated, a default home screen (see FIG. 3) is displayed on the display 14. The user can perform processing relevant to a function icon (first icon) by performing a touch operation by the touch panel 16 to the function icon being displayed on the display 14 in that state. In addition, processing of an application, processing to transit to a menu screen, etc. are included in "processing relevant to a function icon" in this embodiment.

Furthermore, although details will be described later, if a camera application is performed, a power supply of the camera module 50 is turned on and a preview image (through image) corresponding to a photographic subject is displayed on the display 14. Then, the user can photograph the photographic subject by turning the rear surface that the lens aperture 24 is provided to the photographic subject and performing a photographing operation.

Figure 1:
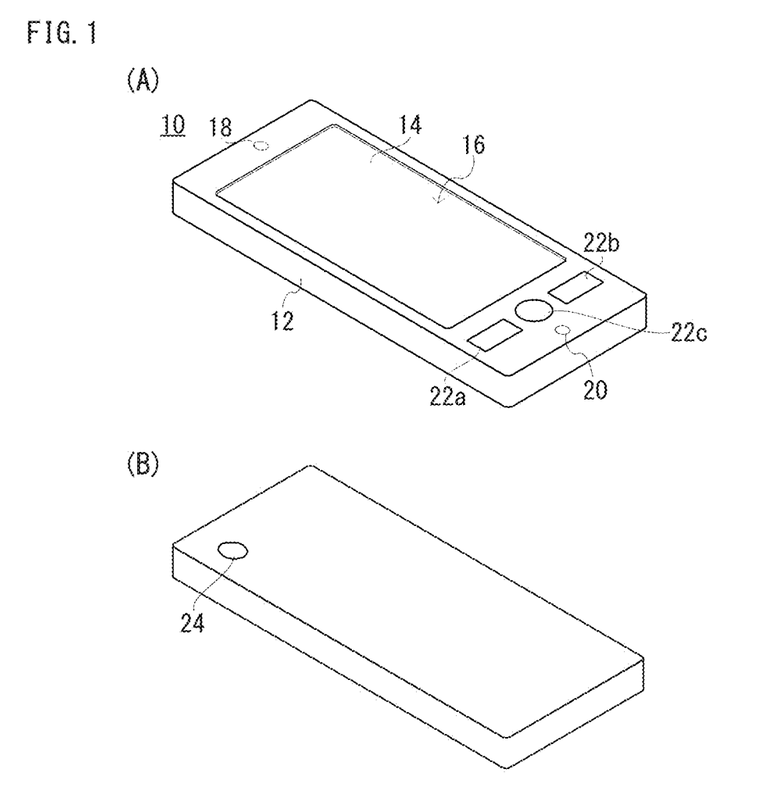
Figure 2:
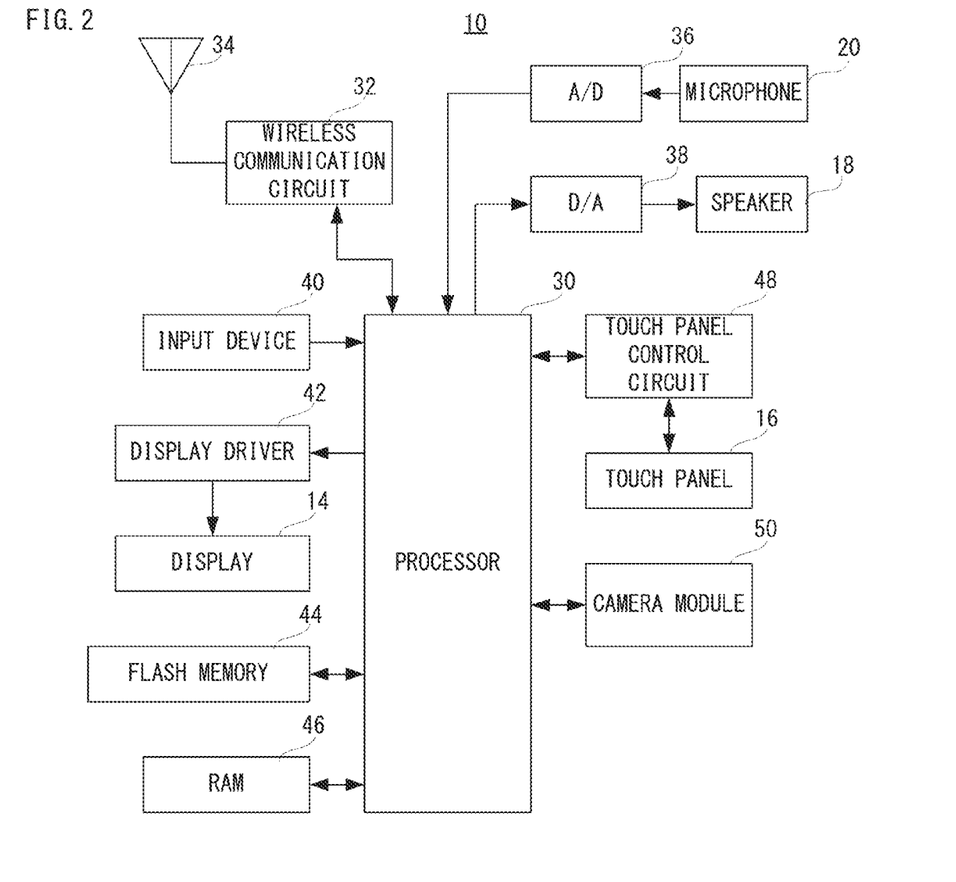
FIG. 2 is an illustration view showing electric structure of the mobile phone shown in FIG. 1.

With referring to FIG. 2, the mobile phone 10 of the embodiment shown in FIG. 1 includes a processor 30 that is called as a computer or a CPU. The processor 30 is connected with a wireless communication circuit 32, an A/D converter 36, a D/A converter 38, an input device 40, a display driver 42, a flash memory 44, a RAM 46, a touch panel control circuit 48, the camera module 50, etc.

The processor 30 is in charge of entire control of the mobile phone 10. A whole or a part of a program that is set in advance in the flash memory 44 is, in use, developed or loaded into the RAM 46 that functions as a storing module, and the processor 30 operates in accordance with the program on the RAM 46. In addition, the RAM 46 is further used as a working area or buffer area for the processor 30.

The input device 40 includes the touch panel 16 and the hardware keys 22 shown in FIG. 1. Therefore, an operation receiving module that receives a touch operation to the touch panel 16 by the user and a key operation to the hard key 22 by the user can be constituted. Information (key data) of the hardware key that the user operates is input to the processor 30.

The wireless communication circuit 32 is a circuit for sending and receiving a radio wave for a telephone conversation, a mail, etc. via an antenna 34. In this embodiment, the wireless communication circuit 32 is a circuit for performing a wireless communication with a CDMA system. For example, if the user designates an outgoing call (telephone call) using the input device 40, the wireless communication circuit 32 performs telephone call processing under instructions from the processor 30 and outputs a telephone call signal via the antenna 34. The telephone call signal is sent to a telephone at the other end of line through a base station and a communication network. Then, when incoming call processing is performed in the telephone at the other end of line, a communication-capable state is established and the processor 30 performs telephone conversation processing.

The microphone 20 shown in FIG. 1 is connected to the A/D converter 36, and as described above, a voice signal from the microphone 20 is input to the processor 30 as digital voice data through the A/D converter 36. The speaker 18 is connected to the D/A converter 38. The D/A converter 38 converts digital voice data into a voice signal to apply to the speaker 18 via an amplifier. Therefore, a voice based on the voice data is output from the speaker 18.

The display driver 42 is connected to the display 14, and therefore, the display 14 displays an image or video in accordance with image or video data that is output from the processor 30. That is, the display driver 42 controls display by the display 14 that is connected to the display driver 40 under instructions by the processor 30. In addition, the display driver 42 includes a video memory that temporarily stores the image or video data to be displayed. The display 14 is provided with a backlight that includes a light source of an LED or the like, for example, and the display driver 42 controls, according to the instructions from the processor 30, brightness, lighting/extinction of the backlight.

The touch panel 16 shown in FIG. 1 is connected to a touch panel control circuit 48. The touch panel control circuit 48 applies to the touch panel 16 a necessary voltage or the like and inputs to the processor 30 a touch start signal indicating a start of a touch to the touch panel 16 by the user, a touch end signal indicating an end of a touch by the user, and coordinate data indicating a touch position that the user touches. Therefore, the processor 30 can determine which object is touched by the user based on the coordinate data.

In the embodiment, the touch panel 16 is of an electrostatic capacitance system that detects change of an electrostatic capacitance occurs between a surface and an object such as a finger close to the surface. The touch panel 16 detects that one or more fingers are brought into contact with the touch panel 16, for example. Therefore, the touch panel 16 is called a pointing device. The touch panel control circuit 48 functions as a detecting module, and detects a touch operation within a touch-effective range of the touch panel 16, and outputs coordinate data indicative of a position of the touch operation to the processor 30. That is, the user inputs an operation position, an operation direction, etc. through a touch operation on the surface of the touch panel 16 to the mobile phone 10.

A tap operation, a long tap operation, a flick operation, a slide operation, etc. are included in the touch operation of this embodiment.

The tap operation is an operation that a finger is brought into contact with the surface of the touch panel 16, and then, the finger is lifted (released) from the surface of the touch panel 16 within a short time. The long tap operation is an operation that a finger is continued to be brought into contact with a surface of the touch panel 16 for a predetermined time period, and then, the finger is released from the surface of the touch panel 16. The flick operation is an operation that a finger is brought into contact with the surface of the touch panel 16, and flips the finger in an arbitrary direction with a predetermined speed or more. The slide operation is an operation that a finger is moved in an arbitrary direction while being kept to be brought into contact with the surface of the touch panel 16, and then, the finger is released from the surface of the touch panel 16.

In addition, in the above-mentioned slide operation, a slide operation that a finger is brought into contact with an object being displayed on the surface of the display 14 and makes the object move, that is, a so-called drag operation is also included.

In addition, in the following description, an operation that a finger is released from a surface of the touch panel 16 after the drag operation is called a drop operation. Furthermore, there is an occasion that the touch operation, the long tap operation, the flick operation, the slide operation, the drag operation and the drop operation may be described with omitting the word "operation", respectively.

In addition, for a detection system of the touch panel 16, instead the above-mentioned electrostatic capacitance system, a resistance film system, an ultrasonic system, an infrared ray system, an electromagnetic induction system or the like may be adopted. Furthermore, a touch operation is not limited to a finger, may be performed by a stylus or the like.

Furthermore, a picto indicating a status of the mobile phone 10, an icon for performing a function, a widget (gadget), a file, a folder, etc. are included in the object of this embodiment.

The camera module 50 includes a control circuit, a lens, an image sensor, etc. The processor 30 enables the control circuit and the image sensor if an operation for performing a camera function is performed. Then, if image data based on a signal that is output from the image sensor is input to the processor 30, a preview image according to a photographic subject is displayed on the display 14.

In the mobile phone 10 of this embodiment, the user can perform an application such as a mail function, an alarm function, etc. other than a telephone function.

Figure 3:
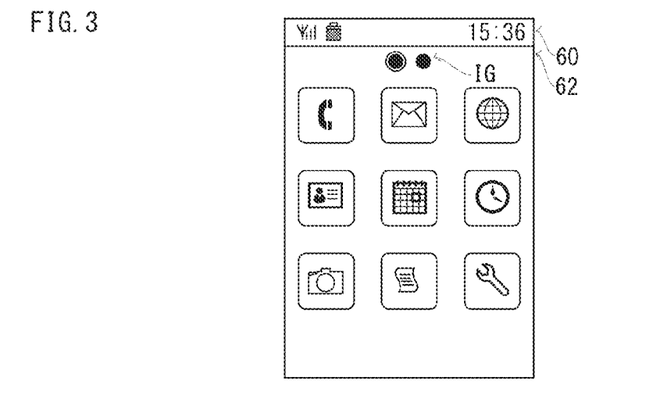
FIG. 3 is an illustration view showing an example of a first home screen displayed on a display shown in FIG. 1.

FIG. 3 is an illustration view showing an example of a home screen displayed on the display 14. A display range of the display 14 includes a status display area 60 and a function display area 62. In the status display area 60, a picto showing a radio-wave receiving status by the antenna 34, a picto showing a residual battery capacity of a secondary battery and a date and time are displayed. Furthermore, a home screen including a plurality of function icons (first icon) is displayed in the function display area 62.

Furthermore, a plurality of home screens are set to the mobile phone 10 of this embodiment, and an indicator IG indicating a home screen currently displayed is displayed in an upper portion of the home screen. For example, since two figures are included in the indicator IG shown in FIG. 3, it is possible to understand that two home screens are set. Furthermore, since a figure in a left side is selected by a cursor, FIG. 3 shows that a home screen in a left side among the two home screens is currently displayed. In addition, in the following description, the home screen of the left side shown in FIG. 3 is called a first home screen.

Figure 4:
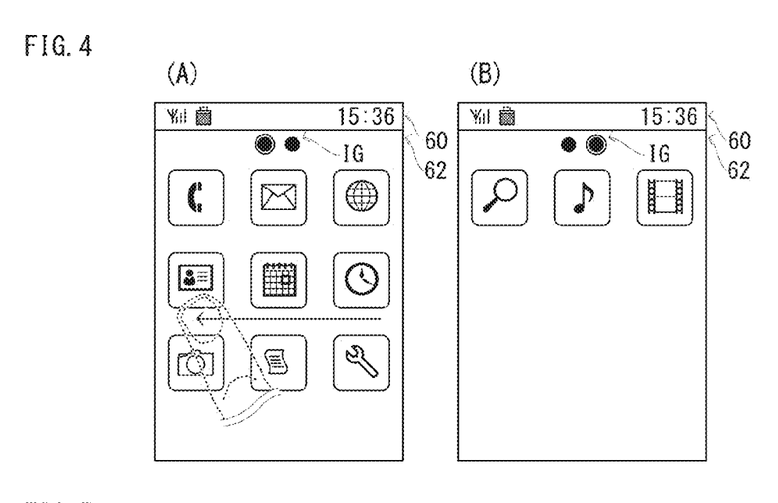

With reference to FIGS. 4(A) and 4(B), if a touch operation that is slid leftward is performed in a state where the first home screen is displayed, a home screen in a right side (second home screen) is displayed on the display 14. Function icons different from those of the first home screen are displayed on the second home screen, and the indicator IG is rendered in a state where a figure of a right side is selected by the cursor. Furthermore, although illustration is omitted, if a touch operation that is slid rightward is performed in a state where the second home screen is displayed, the first home screen is displayed again. Hereinafter, an operation that changes the display of the display 14 as mentioned above is called a screen change operation.

Furthermore, if a touch operation more than a predetermined time period is performed to an arbitrary function icon, the user can change a display position of the function icon arbitrarily by a touch operation. Furthermore, the user can change the number of home screens arbitrarily. Furthermore, the user can also move arbitrarily the function icon currently displayed on the home screen to a home screen newly added.

In addition, in this embodiment, a home screen set in the left side most, i.e., the first home screen is made a default home screen that is to be displayed at a time that the home key 22c is operated.

Figure 5:
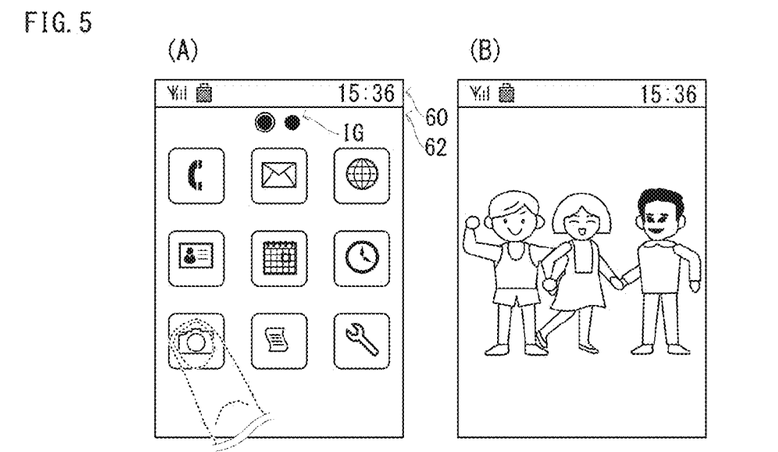

FIGS. 5(A) and 5(B) illustrate an example of an operation for performing an application from the home screen. For example, a camera application becomes to be performed if the user performs a touch operation to the function icon relevant to a camera application as shown in FIG. 5(A). If performing the camera application, a preview image is displayed in the function display area 62 as shown in FIG. 5(B). Then, the user can photograph by performing a touch operation in an arbitrary position in the function display area 62.

Here, in the mobile phone 10 of this embodiment, in order to prevent an erroneous operation due to an unintentional input by the user to the touch panel 16, it is possible to set a lock state restricting performance of the predetermined processing based on touch operation. If the end key 22b is operated, for example, a lock state is set, while the power supply of the display 14 and the touch panel 16 is turned off. If the home key 22c, etc. is operated in this state, the power supply of the display 14 and the touch panel 16 is turned on, and the lock screen is displayed, and a cancellation operation of a lock state becomes to be received.

Then, in this embodiment, a lock screen for canceling the lock state is produced based on the home screen. On the lock screen thus produced, the user can perform arbitrary processing while canceling the lock state.

Figure 6:
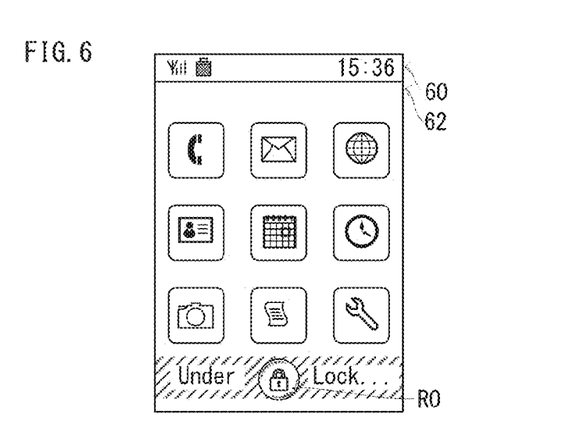
FIG. 6 is an illustration view showing an example of a lock screen displayed on the display shown in FIG. 1.

FIG. 6 is an illustration view showing the lock screen produced based on the first home screen. A cancellation icon corresponding to the function icon included in the first home screen is displayed on the lock screen. Since the cancellation icon is displayed using the same image data as the corresponding function icon, an appearance thereof is approximately the same as the function icon. However, even if a touch operation is performed to the cancellation icon, the application is not performed in the same way as the touch operation to the function icon.

Furthermore, in a lower portion of the lock screen, an indication indicative of the lock screen and a lock object RO are displayed. In addition, the indicator IG is not displayed in the lock screen that is produced based on the home screen. By such a manner, the user can recognize that the mobile phone 10 is in the lock state.

Figure 7:
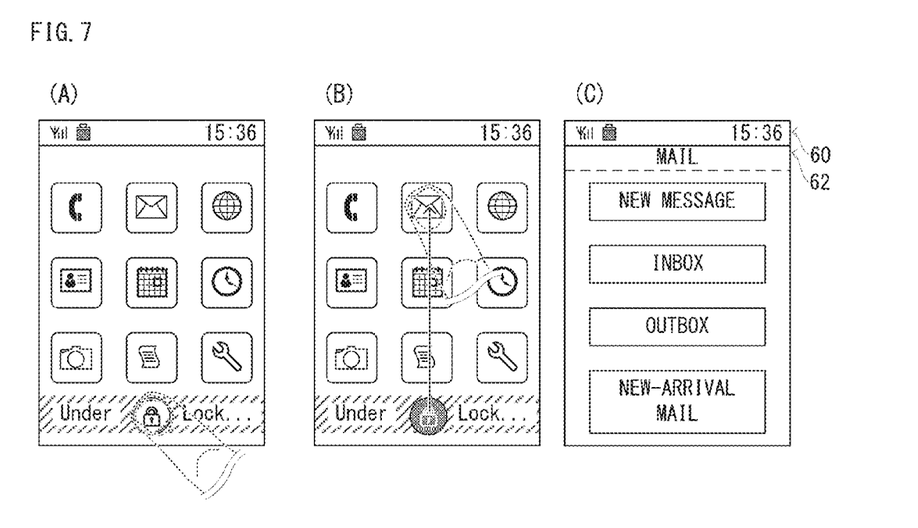

With reference to FIGS. 7(A)-7(C), a cancellation operation for canceling the lock state will be described. In the following description, an expression called "finger" for a subject to contact is used for convenience of description. If the finger is slid toward the cancellation icon corresponding to the arbitrary application after the lock object RO is touched by the finger, in order to indicate that the lock object RO receives a cancellation operation, a color of the lock object RO is reversed. If the finger is slid to the display position of the cancellation object corresponding to a mail application in this state and then released, the lock state is canceled and the mail application is performed. In addition, although a locus of a slide is illustrated in the drawing, the locus of the slide is not displayed in fact.

By displaying the lock screen thus produced based on the home screen, with feeling in operating the home screen, the user can perform an arbitrary application while canceling the lock state. More specifically, by operating the cancellation icon on the lock screen arranged similarly to the icon displayed on the home screen, for example, the user becomes to be able to perform an arbitrary application while canceling a lock state. Therefore, the operability for the user in the lock screen can be improved.

In addition, in this embodiment, in order to indicate that the cancellation operation is received, a color of the lock object RO is reversed, but a user may be notified by vibration by a vibrator, sound, etc. in other embodiments.

Here, in an initial state, a lock screen is produced based on the home screen displayed at last. For example, if a lock state is set in a state where the first home screen is currently displayed, the lock screen is produced based on the first home screen, and if a lock state is set in a state where the second home screen is currently displayed, a lock screen is produced based on the second home screen.

Furthermore, if a lock state is set when an application is performed using the function icon of the first home screen, it is determined that the home screen currently displayed at last is the first home screen, and a lock screen is produced based on the first home screen. Thus, since a lock screen is produced based on the home screen displayed at last, it becomes easy for a user to grasp the cancellation icon displayed on the lock screen.

Figure 8:
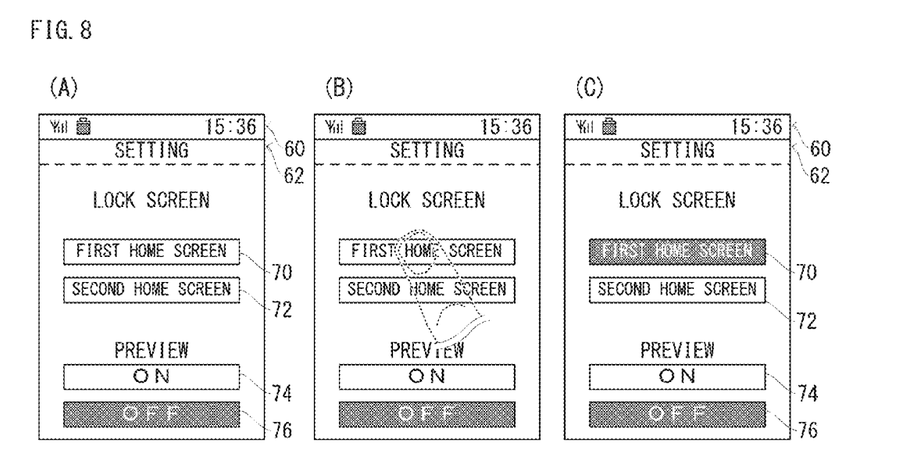

However, the user can designate the home screen for producing a lock screen arbitrarily. As shown in FIG. 8(A), keys respectively corresponding to the home screens set in the mobile phone 10 are displayed on a setting screen of a lock state. In addition, a home screen is not designated in an initial state of the setting screen.

With reference to FIGS. 8(A)-8(C), in this embodiment, since two home screens are set, a first designation key 70 corresponding to the first home screen and a second designation key 72 corresponding to the second home screen are displayed. Furthermore, an on-key 74 and an off-key 76 are also displayed as a key relevant to the display of a preview image describe later.

If a touch operation is performed to the first designation key 70 in a state shown in FIG. 8(A), a color of the first designation key 70 is reversed. When the color of the first designation key 70 is reversed, it is rendered in a state where the first home screen is designated as a home screen for producing a lock screen. If a lock state is set in the state where the first home screen is designated, regardless of the display of the display 14, a lock screen is produced based on the first home screen. For example, the user can set arbitrarily the cancellation icon displayed on the lock screen by arranging an arbitrary function icon on the first home screen. Thus, the user can arbitrarily designate an original home screen of the lock screen to be produced.

Furthermore, although illustration is omitted, if a touch operation is performed to the second designation key 72, a color of the second designation key 72 is reversed, and it is rendered in a state where the second home screen is designated as a home screen for producing a lock screen.

In addition, in other embodiments, a home screen to be displayed by default may be designated in advance.

Figure 9:
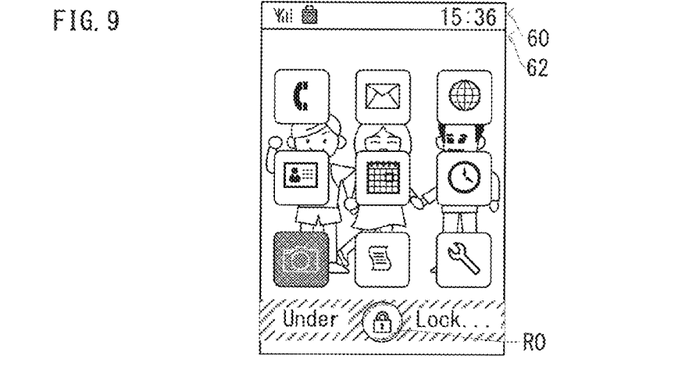
FIG. 9 is an illustration view showing another example of the lock screen displayed on the display shown in FIG. 1.

Furthermore, with reference to FIG. 9, when a cancellation icon corresponding to a camera application (hereinafter, called a camera icon) is displayed on the lock screen, the preview screen is displayed as a background of the lock screen. In this state, if it is rendered in a state where the color of the camera icon is reversed and a touch operation is performed to the camera icon, photography processing is performed. That is, in such a state, the user can perform a photographing operation without canceling a lock state.

Furthermore, it is possible to set by the on-key 74 and the off-key 76 in the setting screen whether the preview image is to be displayed in the lock screen. For example, the user should just touch to the on-key 74 when the preview image is to be displayed in the lock screen, and when not displaying, the user should just touch to the off-key 76. Then, each of these keys is rendered in a state where a color thereof is reversed if touched. Thus, even if it is in the lock state, the user becomes easy to perform photography.

In addition, in a state where the preview image is displayed on the background of the lock screen, the cancellation icons other than the camera icon may be made translucent or light-colored not to hinder the display of the preview image. By such a manner, it becomes easier for the user to perform photography of a desired image.

In addition, even if the display of the display 14 is not changed for a predetermined time period, the display 14 is turned off automatically and a lock state is set.

Furthermore, in the lock state of this embodiment, since the power supply of the display 14 and the touch panel 16 is turned off until the lock screen becomes to be displayed, the power consumption of the mobile phone 10 is suppressed. However, in other embodiments, a touch operation may be made invalid by making the processor 30 not process a touch operation being input without turning off the power supply of the touch panel 16.

Furthermore, in other embodiments, the lock state may be canceled and the home screen may be displayed when the lock object RO is flicked in an arbitrary direction. Furthermore, in a case where the display 14 of the mobile phone 10 includes a pressure-sensitive sensor and feedback processing of the touch operation according to a vibrator is performed, if a cancellation icon is operated by a touch operation depressing the touch panel 16 (hereinafter, click operation), a lock state may be canceled and thus the processing relevant to a cancellation icon may be performed.

In the above, the feature of the embodiment is outlined. In the following, the embodiment will be described in detail using a memory map showing in FIG. 10 and flowcharts shown in FIG. 11-FIG. 13.

Figure 10:
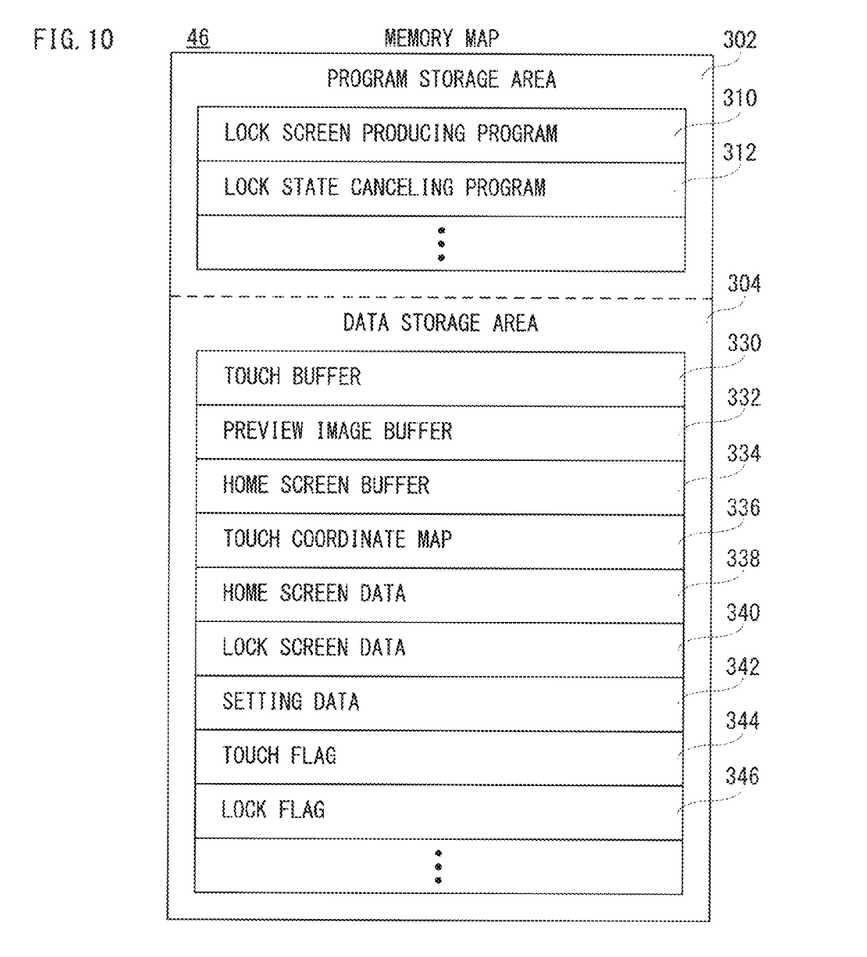
FIG. 10 is an illustration view showing an example of a memory map of a RAM shown in FIG. 2.

With referring FIG. 10, the RAM 46 shown in FIG. 2 is formed with a program storage area 302 and a data storage area 304. As previously described, the program storage area 302 is an area for reading and storing (developing) a whole or a part of program data that is set in advance in the flash memory 44 (FIG. 2).

The program storage area 302 is stored with a lock screen producing program 310, a lock state canceling program 312, etc. The lock screen producing program 310 is a program for producing a lock screen based on a home screen. The lock state canceling program 312 is a program for canceling a lock state or for performing a function while canceling a lock state. Furthermore, the lock screen producing program 310 and the lock state canceling program 312 may be called a lock state control program collectively.

In addition, the program storage area 302 further includes programs for performing a mail application, an alarm application, etc.

The data storage area 304 of the RAM 46 is formed with a touch buffer 330, a preview image buffer 332, a home screen buffer 334, etc. Furthermore, the data storage area 304 is stored with a touch coordinate map 336, home screen data 338, lock screen data 340, setting data 342, etc., and provided with a touch flag 344 and a lock flag 346.

The touch buffer 330 is stored with touch coordinate data that is output by the touch panel control circuit 48. The preview buffer 332 is temporarily stored with an image that is output from the camera module 50. Furthermore, when displaying a preview image, image data is read from the preview image buffer 332. The home screen currently displayed is temporarily stored in the home screen buffer 334. Furthermore, in the home screen buffer 334, the data of a former home screen is not removed until a latter home screen becomes to be displayed. Therefore, even if an application is performed from the home screen, the display data of the home screen is held by the home screen buffer 334.

The touch coordinate map 336 is data for mapping the touch coordinate in the touch operation with the display coordinate of the display 14. That is, based on the touch coordinate map 336, a result of the touch operation performed to the touch panel 16 is reflected in the display of the display 14.

The home screen data 338 is data for displaying the home screen being set, for example, the first home screen and the second home screen. The lock screen data 340 is data of the lock screen produced by the lock screen producing program 310. The setting data 342 is data corresponding to a result that is set in the setting screen. Therefore, if setting is changed on the setting screen, the content of the setting data 342 is also changed.

The touch flag 344 is a flag for determining whether a touch to the touch panel 16 is performed. The touch flag 344 is constructed by a 1-bit register, for example. If the touch flag 344 is turned on (true), a data value "1" is set in the register. On the other hand, if the touch flag 344 is turned-off (false), a data value "0" is set in the register. In addition, the touch flag 344 is switched on/off based on a signal that the touch panel control circuit 48 outputs.

Furthermore, the lock flag 346 is a flag indicating whether the lock state is set. For example, the lock flag 346 is turned on in response to the processing that turns off the power of the display 14 and the touch panel 16. Furthermore, the lock flag 346 is turned off in response to the processing of the above-described lock state canceling program 310. Then, since structure of the lock flag 346 is approximately the same as those of the touch flag 344, a detailed description about the structure is omitted.

The data storage area 304 is stored with the image data that is displayed in the standby state, data of character strings, etc., and provided with counters and flags necessary for an operation of the mobile phone 10.

Figure 11:
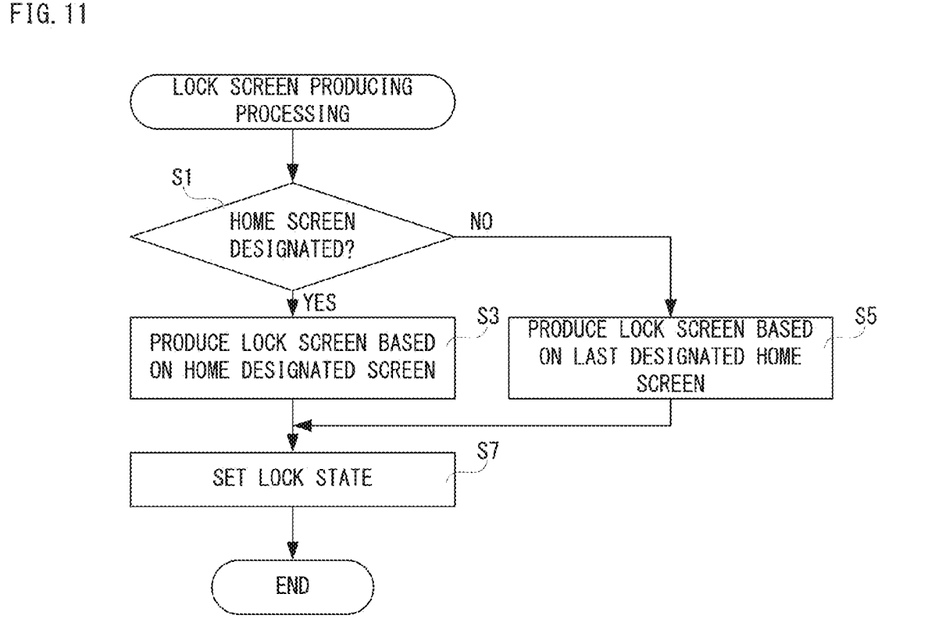
FIG. 11 is a flowchart showing an example of lock screen producing processing of a processor shown in FIG. 2.
Figure 12:
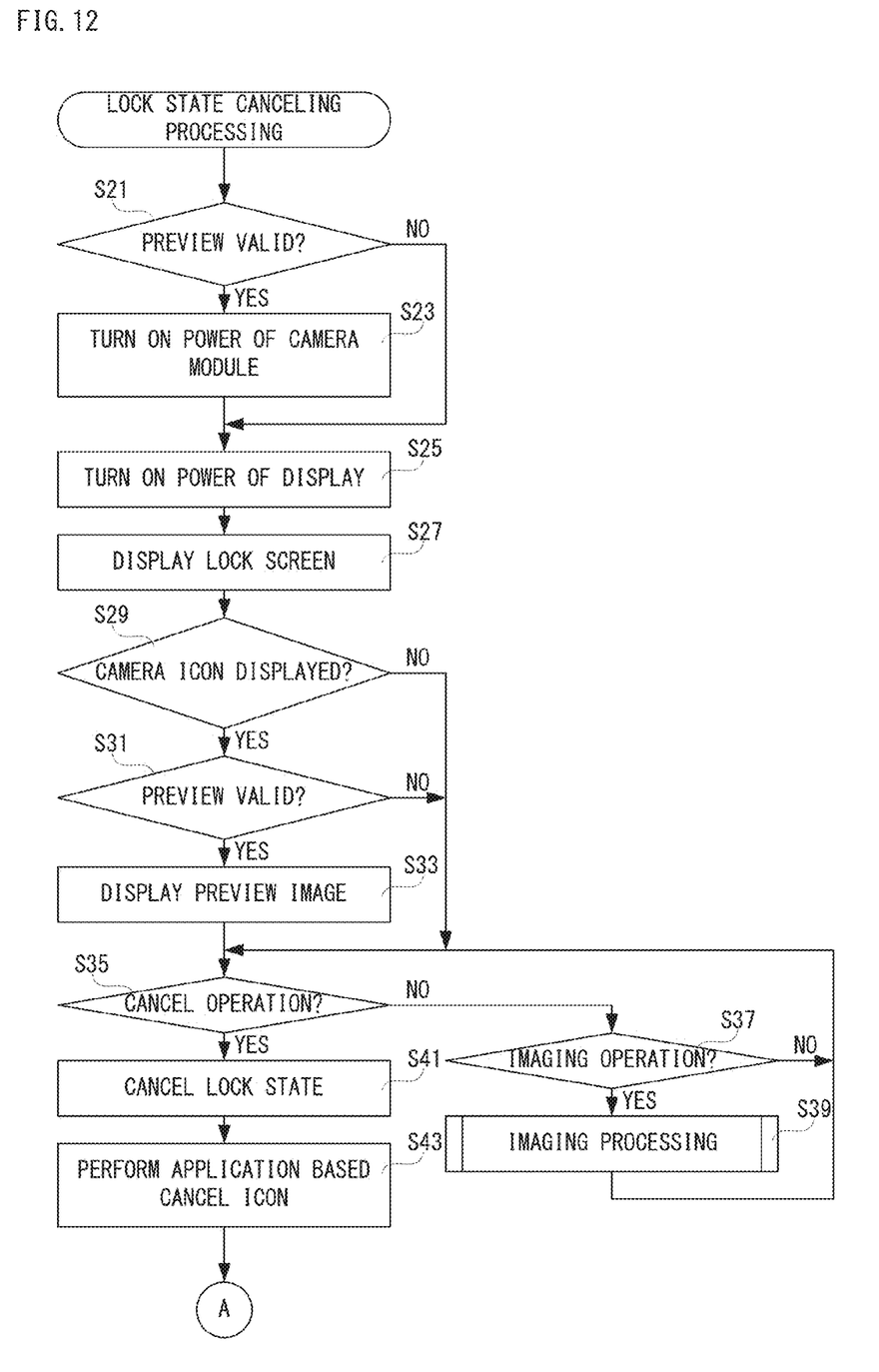
FIG. 12 is a flowchart showing an example of a part of lock state canceling processing of the processor shown in FIG. 2.
Figure 13:
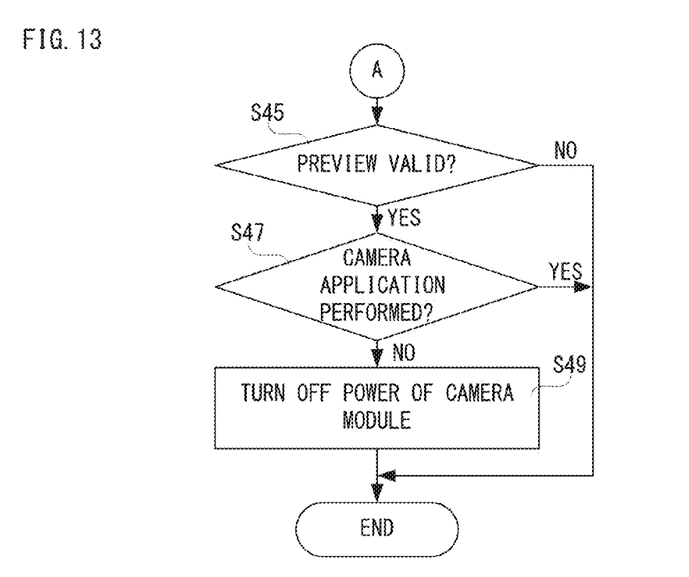
FIG. 13 is a flowchart showing another part of the lock state canceling processing of the processor shown in FIG. 2, following FIG. 12.

The processor 30 processes a plurality of tasks including lock screen producing processing shown in FIG. 11, lock state canceling processing shown in FIG. 12 and FIG. 13, etc. in parallel with each other under controls of Linux (registered trademark)-base OS such as Android (registered trademark) and REX, or other OSs.

The lock screen producing processing is started when the power supply of the display 14 is turned off. The processor 30 determines, in a step S1, whether a home screen is designated. That is, by reading the setting data 342, it is determined whether it is rendered in a state where an arbitrary home screen is set. If "YES" is determined in the step S1, that is, if it is in a state where the first home screen is designated, for example, the processor 30 produces a lock screen based on the home screen designated in the step S3. For example, the processor 30 reads data of the first home screen from the home screen data 338 to produce a lock screen. The processor 30 that performs the processing of the step S3 functions as a first producing module.

On the other hand, if "NO" is determined in the step S1, that is, if a home screen is not designated as shown in FIG. 8(A), for example, the processor 30 produces, in a step S5, a lock screen based on a home screen having been displayed at last. That is, data of the home screen displayed at last is read from the home screen buffer 334, and a lock screen is produced based on that data. The processor 30 that performs the processing of the step S5 functions as a second producing module.

In addition, a lock screen that is produced by the processing of the steps S3 and S5 is saved in the RAM 46 as the lock screen data 340. The processor 30 that performs the processing of the steps S3 and S5 functions as a producing module.

After the processing of the step S3 or step S5 is ended, the processor 30 sets a lock state in a step S7. That is, the lock flag 346 is turned on. Then, after the processing of the step S7 is ended, the processor 30 terminates the lock screen producing processing.

FIG. 12 is a flowchart of lock state canceling processing. For example, if an operation that turns on the power supply of the display 14 is performed, the processor 30 determines, in a step S21, whether a preview is valid. That is, the processor 30 reads the setting data 342 to determine whether it is rendered in a state where setting that a preview image is to be displayed in a lock screen is made. If "NO" is determined in the step S21, that is, if the setting that a preview image is to be displayed in a lock screen is not made, the processor 30 proceeds to processing of a step S25.

On the other hand, if "YES" is determined in the step S21, that is, if the setting that a preview image is to be displayed in a lock screen is made, the processor 30 turns on the power supply of the camera module 50 in a step S23.

Subsequently, in the step S25, the processor 30 turns on the power supply of the display 14. Subsequently, the processor 30 displays a lock screen in a step S27. That is, the processor 30 reads the lock screen data 340 corresponding to a lock screen produced, and displays on the display 14 the lock screen as shown in FIG. 6 based on that data. The processor 30 that performs the processing of the step S27 functions as a display processing module.

Subsequently, the processor 30 determines, in a step S29, whether the camera icon is currently displayed. That is, the processor 30 determines whether a cancellation object corresponding to the camera application is included in the lock screen currently displayed. If "NO" is determined in the step S29, that is, if the camera icon is not displayed in the lock screen, the processor 30 proceeds to processing of a step S35.

On the other hand, if "YES" is determined in the step S29, that is, if the camera icon is displayed in the lock screen, the processor 30 determines, in a step S31, whether a preview is valid, like the step S21. If "NO" is determined in the step S31, that is, if the setting that a preview image is to be displayed in a lock screen is not made, the processor 30 proceeds to processing of the step S35. On the other hand, if "YES" is determined in the step S31, that is, if the setting that a preview image is to be displayed in a lock screen is made, the processor 30 displays a preview image in a step S33. For example, a preview image is read from the preview image buffer 332, and the preview image is displayed on the display 14 as a background of the lock screen as shown in FIG. 9. The processor 30 that performs the processing of the step S33 functions as a preview image display module.

Subsequently, the processor 30 determines, in the step S35, whether it is a cancellation operation. The processor 30 determines whether a cancellation operation is performed as shown in FIGS. 7(A) and 7(B), for example. If "NO" is determined in the step S35, that is, if a cancellation operation is not performed, the processor 30 determines, in a step S37, whether a photographing operation is performed. For example, the processor 30 determines whether a touch operation is performed to the camera icon in a state where the preview image is displayed. If "NO" is determined in the step S37, that is, if the preview image is not displayed, or if a photographing operation is not performed even when the preview image is displayed, for example, the processor 30 returns to the processing of the step S35. On the other hand, if "YES" is determined in the step S37, that is, if a photographing operation is performed, the processor 30 performs photography processing in a step S39, and returns to the processing of the step S35. That is, the image corresponding to the preview image currently displayed is saved.

If "YES" is determined in the step S35, that is, if the cancellation operation is performed, the processor 30 cancels the lock state in a step S41. That is, the lock flag 346 is turned off. Subsequently, the processor 30 performs an application based on the cancellation icon in a step S43. When the cancellation operation is performed using the cancellation icon corresponding to the mail application, as shown in FIG. 7(B), for example, the processor 30 performs the mail application.

Subsequently, the processor 30 determines, in a step S45, whether a preview is valid, like the step S21. If "NO" is determined in the step S45, that is, if the setting that a preview image is to be displayed in the lock screen is not made, the processor 30 terminates the lock state canceling processing. On the other hand, if "YES" is determined in the step S45, that is, if the setting that a preview image is to be displayed in the lock screen is made, the processor 30 determine, in a step S47, whether a camera application is performed. If "YES" is determined in the step S47, that is, if the camera application is performed, the processor 30 terminates the lock state canceling processing. On the other hand, if "NO" is determined in the step S47, that is, if the camera application is not performed, the processor 30 turns off the power supply of the camera module 50 in a step S49. That is, since it is unnecessary to make the camera module 50 operate continuously, the power supply of the camera module 50 is turned off. Then, after the processing of the step S49 is ended, the processor 30 terminates the lock state canceling processing.

Figure 14:
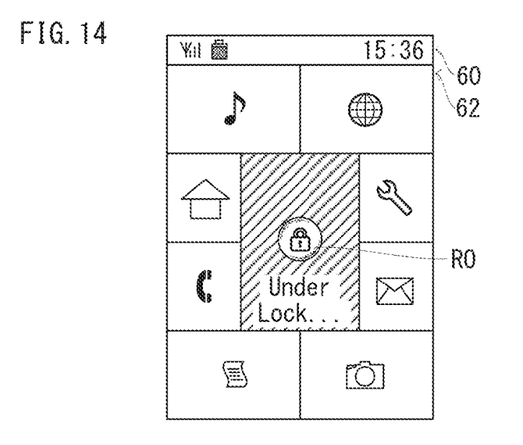
FIG. 14 is an illustration view showing another example of the lock screen displayed on the display shown in FIG. 1.
Figure 15:
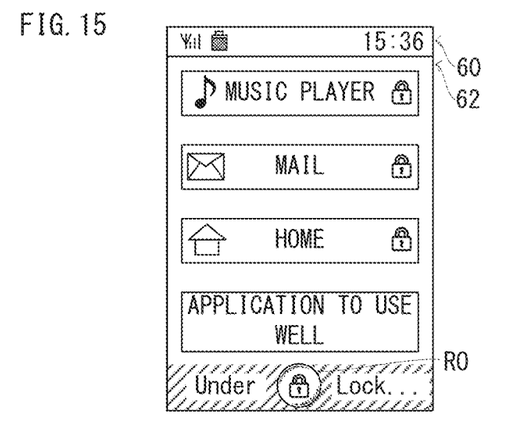
FIG. 15 is an illustration view showing the other example of the lock screen displayed on the display shown in FIG. 1.

In addition, in other embodiments, instead the lock screen based on the home screen, an exclusive lock screen may be displayed such as a tile type lock screen shown in FIG. 14, a list type lock screen shown in FIG. 15, etc. For example, on these exclusive lock screens, a display position of each cancellation object (a cancellation tile, a cancellation list) is set based on a use frequency of the application by the user or an operation by the user. Furthermore, not only an application but a home screen may be related with the cancellation object. Furthermore, if a cancellation operation that the lock object RO is a start point of a touch and the cancellation object is an end point thereof is performed in also the tile type lock screen or the list type lock screen, as similar to the home screen type lock screen, the lock state is canceled, and the processing relevant to the cancellation object is performed.

Furthermore, it may be possible to change the lock screen displayed on the display 14 to any one of the home type, tile type and list type by a screen change operation.

Furthermore, in other embodiments, when a cancellation operation of the lock state is performed, a security screen asking for an input of a password may be displayed. If a cancellation operation shown in FIGS. 7(A) and 7(B), for example is performed, a security screen is displayed on the display 14. Then, if a correct password is input in the security screen, a screen shown in FIG. 7(C) is displayed on the display 14. A re-input of a password is called for when an incorrect password is entered at this time.

Furthermore, if a telephone call occurs when the lock screen is displayed, the display of the lock screen is non-displayed, and a telephone call answer screen is displayed. In this telephone call answer screen, a telephone call answering object for canceling the lock state and for answering to the telephone call is included. Then, a telephone conversation is started if a touch operation is performed to the telephone call answering object.

Furthermore, in other embodiments, by adopting a display 14 having a touch panel function, the touch panel 16 on the display 14 may not be provided.

Furthermore, the programs used in this embodiment may be stored in an HDD of a data distribution server, and distributed to the mobile phone 10 via a network. The plurality of programs may be stored in storage medium such as an optical disk of CD, DVD, BD (Blue-Ray Disk) or the like, a USB memory, a memory card, etc., and then, such the storage medium may be sold or distributed. In a case where the programs downloaded via the above-described server or storage medium are installed to a portable terminal having the structure equal to the structure of the embodiment, it is possible to obtain advantages equal to advantages according to the embodiment.

The specific numerical values mentioned in this specification are only examples, and changeable properly in accordance with the change of product specifications.

It should be noted that reference numerals inside the parentheses and the supplements show one example of a corresponding relationship with the embodiments described above for easy understanding of the invention, and do not limit the invention.

An embodiment is a portable terminal that has a display module operable to display a home screen including at least a first icon and a touch panel provided in the display module, and a lock state of restricting a performance of predetermined processing based on a touch operation can be set, comprising: a producing module operable to produce a lock screen that includes a second icon corresponding to the first icon; a display processing module operable to display the lock screen when a power supply of the display module is turned on in a state where the lock state is set; a canceling module operable to cancel if a cancellation operation that includes at least an operation touching to the second icon is performed when the lock screen is displayed; and a performance module operable to perform the processing based on the first icon corresponding to the second icon when the cancellation operation that includes at least an operation touching to the second icon is performed.

In this embodiment, the portable terminal (10: reference numeral exemplifying a portion or module corresponding in the embodiment, and so forth) is displayed with the home screen that a plurality of first icons are included, for example on the display module (14). The display module is provided with the touch panel (16), and if a touch operation is performed to the first icon, the processing (application etc.) relevant to that first icon is performed. Furthermore, if the power supply of the display module, for example is turned off, the lock state of restricting performance of the predetermined processing based on a touch operation is set. The producing module (30, S3, S5) produces a lock screen including the second icon (cancellation icon) corresponding to the first icon before shifting to the lock state, for example. The display processing module (30, S27) displays the lock screen produced on the display module if the power supply of the display module is turned on in the state where the lock state is set. The canceling module (30, S41) cancels the lock state if the cancellation operation including an operation touching the second icon is performed in the state where the lock screen produced is displayed. The performance module (30, S43) performs the processing based on the first icon corresponding to the second icon if the cancellation operation is performed as mentioned above.

According to the embodiment, a user can perform arbitrary processing while canceling a lock state with feeling that operates a home screen. Therefore, operability for the user in the lock screen is improved.

In another embodiment, a plurality of home screens are displayed on the display module, and the producing module includes a first producing module operable to produce a lock screen including the second icon corresponding to the first icon included in the home screen designated.

In the embodiment, the first home screen and the second home screen are displayed on the display module, for example. When the first home screen is designated by the user, for example, the first producing module (30, S3) produces the lock screen including the second icon corresponding to the first icon included on the first home screen.

According to the embodiment, the user can designate an original home screen of the lock screen produced arbitrarily.

In a further embodiment, a plurality of home screens are displayed on the display module, and the producing module includes a second producing module operable to produce a lock screen including the second icon corresponding to the first icon included in the home screen displayed at last.

In the further embodiment, the first home screen and the second home screen are displayed on the display module like the second invention. The second producing module (30, S5) produces the lock screen including the second icon corresponding to the first icon included in the home screen having been displayed before the application is performed, i.e., the home screen displayed at last.

According to the further embodiment, since the lock screen is produced based on the home screen displayed at last, it becomes easy for the user to grasp the second icon displayed on the lock screen.

A still further embodiment further comprise a camera module; and a preview image display module operable to display a preview image based on an output of the camera module in the lock screen.

In the still further embodiment, when a camera application is performed, the power supply of the camera module (50) is turned on. For example, the preview image display module (30, S33) displays the preview image based on the output of the camera module as a background of the lock screen at the time that the camera application is performed.

In a yet further embodiment, the preview image display module displays a preview image as a background of the lock screen when the second icon relevant to the camera application is currently displayed.

In the yet further embodiment, when the camera application can be performed, the preview image is displayed as the background of the lock screen.

According to the still further embodiment and the yet further embodiment, even if it is in the lock state, it becomes easy for the user to perform photography.

In a yet still further embodiment, the first icon corresponding to the second icon is the first icon that at least a part of a display position thereof overlaps with the second icon.

The other embodiment is a lock state control method in a portable terminal (10) that has a display module (14) operable to display a home screen including at least a first icon and a touch panel (16) provided in the display module, and a lock state of restricting a performance of predetermined processing based on a touch operation can be set, a processor (30) of the portable terminal performing steps of: producing (S3, S5) a lock screen that includes a second icon corresponding to the first icon; display-processing (S27) the lock screen when a power supply of the display module is turned on in a state where the lock state is set; canceling (S41) if a cancellation operation that includes at least an operation touching to the second icon is performed when the lock screen is displayed; and performing (S43) the processing based on the first icon corresponding to the second icon when the cancellation operation that includes at least an operation touching to the second icon is performed.

According also to the other embodiment, a user can perform arbitrary processing while canceling a lock state with feeling that operates a home screen. Therefore, the operability for the user in the lock screen is improved.

Although the present invention has been described and illustrated in detail, it is clearly understood that the same is by way of illustration and example only and is not to be taken by way of limitation, the spirit and scope of the present invention being limited only by the terms of the appended claims.

DESCRIPTION OF NUMERALS

10—mobile phone
14—display
16—touch panel

30—processor
40—input device
44—flash memory
46—RAM
48—touch panel control circuit
50—camera module

The invention claimed is:

1. A portable terminal that has a display operable to display a home screen including one or more first icons, a touch panel provided in the display, a camera, and at least one processor, wherein the at least one processor is configured to:
　　when a lock state, in which processing based on touch operations to the touch panel is restricted, is initiated, generate a lock screen based on the home screen, such that the lock screen comprises, for each of the one or more first icons included in the home screen, a second icon corresponding to processing associated with that first icon, wherein the home screen is different than the lock screen by at least comprising a lock object;
　　when the display is turned on during the lock state, display the lock screen on the display; and,
　　when the generated lock screen comprises one second icon corresponding to processing associated with the camera, and a cancellation operation, which comprises sliding the lock object to a display position of the one second icon, is performed while the lock screen is displayed,
　　cancel the lock state, and
　　unlock the one second icon to perform the processing associated with the camera, including displaying a preview image, based on an output of the camera, in the lock screen.

2. The portable terminal according to claim 1, wherein the at least one processor receives a designation of the home screen, on which the lock screen is to be based, from a plurality of available home screens.

3. The portable terminal according to claim 1, wherein the at least one processor selects the home screen that was most recently displayed from a plurality of available home screens as the home screen on which the generated lock screen is based.

4. The portable terminal according to claim 1, wherein the at least one processor controls the display to display the preview image as a background of the lock screen.

5. The portable terminal according to claim 1, wherein, in the generated lock screen, a display position of each second icon corresponds to a display position of the first icon in the home screen that is associated with the processing corresponding to that second icon.

6. A lock state control method in a portable terminal that has a display operable to display a home screen including one or more first icons, a touch panel, and a processor, the method comprising the processor: when a lock state, in which processing based on touch operations to the touch panel is restricted, is initiated, generating a lock screen based on the home screen, such that the lock screen comprises, for each of the one or more first icons included in the home screen, a second icon corresponding to processing associated with that first icon, wherein the home screen is different than the lock screen by at least comprising a lock object;
　　when the display is turned on during the lock state, displaying the lock screen; and,
　　when the generated lock screen comprises one second icon corresponding to processing associated with the camera, and a cancellation operation, which comprises sliding the lock object to a display position of one second icon, is performed while the lock screen is displayed,
　　canceling the lock state, and
　　unlock the one second icon to perform the processing associated with the camera, including displaying a preview image, based on an output of the camera, in the lock screen.

7. The portable terminal according to claim 5, wherein, in the generated lock screen, each second icon has an identical appearance to the first icon in the home screen that is associated with the processing corresponding to that second icon.

* * * * *